May 30, 1933.                C. L. KENNEDY                1,912,337
                       CONDENSER INDUCTION MOTOR
                    Filed Dec. 28, 1929          2 Sheets-Sheet 1

Witness
Paul F. Bryant

Inventor
Carlton L. Kennedy
by his attorneys
Van Everen, Fish, Hildreth & Cary

May 30, 1933.  C. L. KENNEDY  1,912,337
CONDENSER INDUCTION MOTOR
Filed Dec. 28, 1929  2 Sheets-Sheet 2

Witness  Inventor

Patented May 30, 1933

1,912,337

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

CONDENSER INDUCTION MOTOR

Application filed December 28, 1929. Serial No. 417,199.

The present invention relates to condenser induction motors.

The objects of the present invention are to provide a condenser induction motor having provision for operation at a plurality of speeds primarily by changing the number of poles; to accomplish the pole changing operation with a minimum of external connections; and to provide for satisfactory starting torque on any of the connections.

With these objects in view, the present invention comprises the condenser induction motor hereinafter described and particularly defined in the claims.

Figure 1:
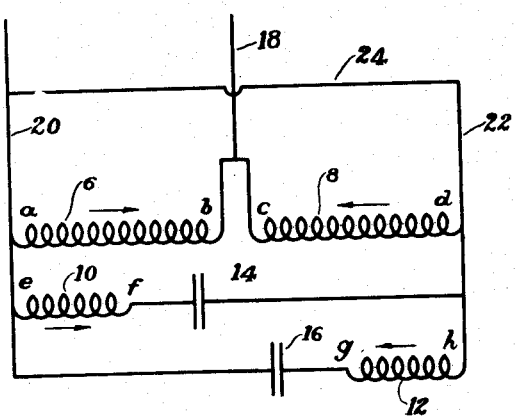
Figure 2:
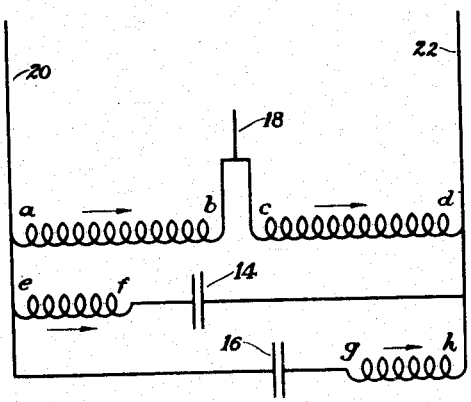
Figure 3:
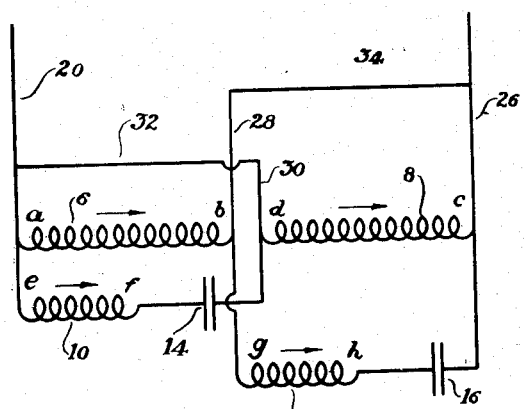
Figure 4:
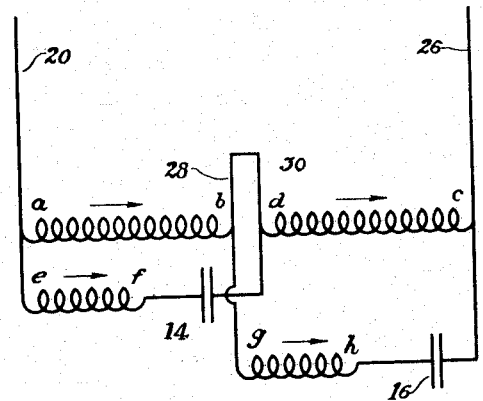
Figure 5:
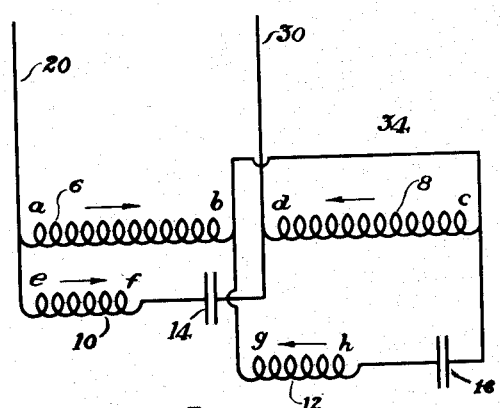
Figures 6, 7:
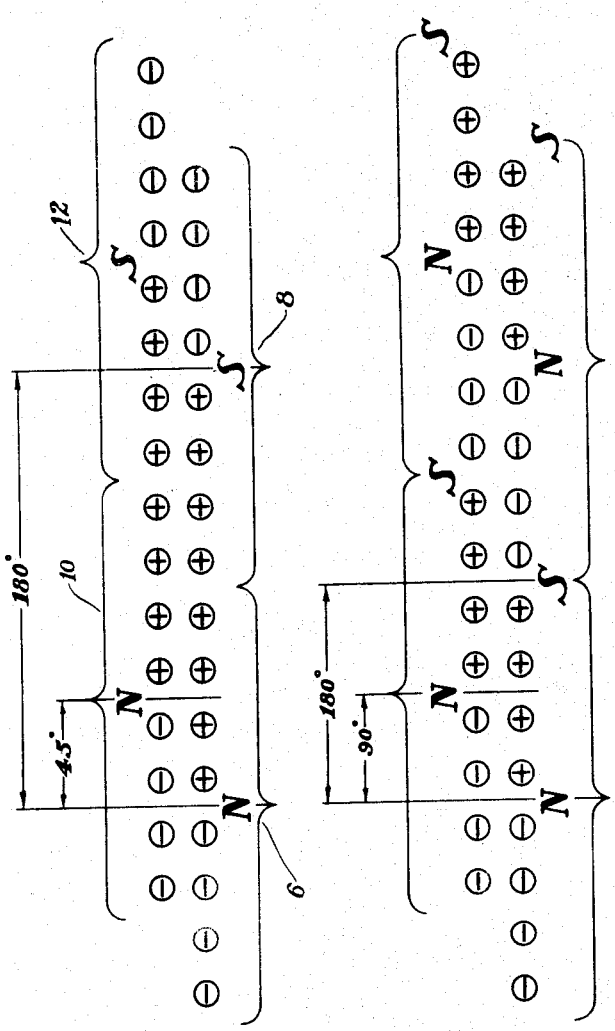

In the accompanying drawings, Fig. 1 is a diagram of the preferred form of motor connected for the smaller number of poles; Fig. 2 is a diagram of the motor shown in Fig. 1 but connected for the larger number of poles; Figs. 3, 4 and 5 are diagrams of a modified form of motor shown connected respectively for high, medium, and low speeds; Fig. 6 is a diagrammatic development of a portion of the stator windings of the motor as connected for the smaller number of poles; and Fig. 7 is a diagrammatic development similar to Fig. 6 but as connected to produce the greater number of poles.

The illustrated embodiment of the invention makes use of a change in polarity of a part of the windings of the motor to change the number of poles and thereby to change the speed. The motor shown in Figs. 1 and 2 is a two-speed motor having permanent internal connections and only three external connections, which latter may be arranged to cause the motor to run at either a high or low speed by altering the number of poles. The motor shown in Figs. 3, 4, and 5 is similar to that of Figs. 1 and 2 in that it provides for high and low speeds by changing the number of poles and also for an intermediate speed by increasing the slip while maintaining the smaller number of poles. In this motor, an extra external lead is required, although the internal connections are permanent.

Before describing the connections of the two forms of motors, the operation of pole changing by reversal of polarity of part of the windings will be explained by reference to Figs. 6 and 7. The stator is here shown as provided with two main windings 6 and 8 and two auxiliary or condenser windings 10 and 12, the latter being displaced in phase from the main windings. The conductors of the several windings are indicated in the conventional manner, the minus signs indicating an instantaneous current coming out toward the reader, and the plus signs an instantaneous current going away from the reader. In Fig. 1, each of the main windings 6 and 8 is shown as distributed over one pole of the motor. With the currents flowing as shown in Fig. 1, the winding 6 forms a north pole and the winding 8 a south pole. The condenser winding 10 forms a north pole displaced 45° from the north pole formed by the main winding 6 and similarly, the condenser winding 12 is displaced 45° from the main winding 8, the complete spread between adjacent poles of opposite polarity being 180°. By merely reversing the polarities of the main winding 8 and the condenser winding 12, leaving the windings 6 and 10 unchanged, the current directions are as shown in Fig. 2. This produces double the number of poles, thus causing the motor to operate at approximately one-half its former speed. Taking 180 electrical degrees as the displacement between a north pole and a south pole, it will be seen that the condenser windings 10 and 12 are respectively displaced from their corresponding main windings by an angle of 90°. The present invention is not limited to the exact displacements of 45° and 90° for the two connections, but in any case, it will be noted that the displacement between the main and condenser windings is twice as great for the connection for the greater number of poles as for the smaller number of poles. The diagrams of Figs. 6 and 7 are intended to show only a stator development for only a single pair of poles for the high speed connection and two pairs of poles for the low speed connection, but obviously, the windings may be extended to produce any number of pairs of poles.

The motor diagrammatically shown in

Figs. 1 and 2 is a two-speed pole changing motor having but three external leads. The main windings 6 and 8 are permanently connected together and the condenser circuits which include the condenser windings 10 and 12 respectively are closed on themselves. The condenser circuits include the condensers 14 and 16 in series with their respective condenser windings 10 and 12. For convenience, the ends of the winding 6 are designated as $a$ and $b$, and those of winding 8 as $c$ and $d$, those of the condenser winding 10 as $e$ and $f$, and those of the condenser winding 12 as $g$ and $h$. The ends $b$ and $c$ of the main windings 6 and 8 are connected together and to a common external lead 18. The leads 20 and 22 connect to points $a$ and $d$. The points $a$ and $e$ and the points $d$ and $h$ are permanently connected.

For the high-speed connection, as shown in Fig. 1, the leads 20 and 22 are connected by a wire 24, and line voltage is impressed between the leads 18 and 20. The motor then operates with the smaller number of poles. The currents in the several windings are indicated by arrows, although it is to be understood that the arrows indicate the relative directions of currents only and do not indicate the phase displacements which exist between the main and condenser windings.

For low-speed operation, the connections are made as shown in Fig. 2. The line voltage is impressed between the leads 20 and 22, the lead 18 being then inactive. No changes in the internal motor connections are necessary.

Assuming, for example, that the motor is wound for four poles in the high-speed connection, the motor will have a synchronous speed of 1800 R. P. M. The displacement between the condenser and main windings is 45 electrical degrees. Each condenser circuit, being short-circuited by the connection 24, can receive no direct energization from the line voltage and the only voltages which exist in the condenser circuit are induced voltages caused by linkage of flux from the main windings and by the rotation of the rotor. The first of these voltages induced in the condenser winding is approximately in phase with the line voltage, while the second voltage is displaced approximately 45 electrical degrees from the line voltage. The first of these voltages, namely, that induced by flux linkages from the main windings, is equivalent to a transformer action and exists even when the rotor is stationary. Therefore, the motor has a starting torque due to currents in the main and condenser windings which are displaced both in time and space from each other. Thus, even though line voltage is not directly impressed upon any part of the condenser circuits, a sufficient voltage exists by induction to afford a satisfactory starting torque and also to permit satisfactory condenser motor operation at running speeds.

For the low-speed connection shown in Fig. 2, the number of poles is increased to eight and the synchronous speed therefore is reduced to 900 R. P. M. It will be noted that the main windings, instead of being in parallel as for the high-speed connection, are now in series. This change from parallel to series connection, in increasing the number of poles, is necessary as in all pole changing motors to maintain the main flux densities substantially constant. The voltages existing in the condenser circuits are quite different from those of the high-speed connection. Inasmuch as the condenser windings are now displaced 90 electrical degrees from the main windings, there is no voltage induced by transformer action, although a voltage 90° out of phase with the line voltage is induced in the condenser windings by the rotation of the rotor as the motor speeds up. At starting, however, there is no induced voltage of any kind in the condenser windings, but inasmuch as the condenser circuits are connected directly across the line, sufficient currents are caused to flow through the condenser circuits to produce a starting torque. These currents are out of phase with the main winding currents because of the reactance of the condensers. Inasmuch as full line voltage is now impressed upon each condenser circuit, a starting torque comparable to the starting torque for the high-speed connection is obtained.

It will be seen that for the high-speed connection which gives the smaller number of poles, starting torque is afforded by the induced voltages in the condenser circuits and not at all by any voltages directly impressed upon the condenser circuits, whereas with the low-speed connection, the conditions are reversed, the starting torque being afforded by the direct application of the line voltage to the condenser circuits and not at all by any induced voltages in the condenser windings. These totally different starting torque conditions are brought about by identical internal connections, the only changes necessary being changes in the three external leads.

As a feature of the motor above described, attention is called to the connections whereby no excessive voltages exist at any time between a main winding and its corresponding condenser winding. The points $a$ and $e$ of the main and condenser windings 6 and 10 are directly connected together and the points $d$ and $h$ of the windings 8 and 12 are connected together. Inasmuch as the windings 6 and 10 carry currents in the same general direction which also holds true for the windings 8 and 12, there is at no point between a main winding and its condenser winding an excessive voltage sufficient to break down the insulation. This is of importance when it is considered that the main and condenser windings are laid in the same slots of the stator.

The motor shown in Figs. 3, 4 and 5 is similar in its electrical characteristics to the motor described above and differs from it only in that an extra external lead is brought out and that by proper combinations of the four leads, three speeds may be obtained. For the high and low speeds, the connections are similar to those shown in Figs. 1 and 2, the change from high to low speed being effected by doubling the number of poles. The intermediate speed is also obtained by a series connection of the main windings without reversal of polarity, whereby the increased slip of the motor under load is availed of to produce a speed about half-way between normal high and low speeds of the rotor.

The main windings 6 and 8, the condenser windings 10 and 12, and the condensers 14 and 16 are as for the motor shown in Figs. 1 and 2. The same letters to indicate the ends of the respective windings are used as in the first case. A lead 20 connects with the points $a$ and $e$ of the windings 6 and 10, another external lead 26 connects with the point $c$ of the main winding 8, and also with its associated condenser circuit. The points $g$ and $b$ are permanently connected together and to an external lead 28, while the point $d$ is permanently connected to the condenser 14 and also to an external lead 30. These are the permanent connections which are not required to be changed.

For the high speed connection of Fig. 3, the leads 20 and 30 are connected together as indicated at 32 and the leads 26 and 28 are connected together as indicated at 34. Line voltage is impressed between the leads 20 and 26. The main windings 6 and 8 are now in parallel and they carry currents in such relative directions as to produce the smaller number of poles. Each condenser circuit is completely short-circuited on itself. All of the connections are electrically identical to those of Fig. 1, and the motor operates in exactly similar fashion.

For the middle speed connection of Fig. 4, the leads 28 and 30 are connected together and the voltage is impressed between the leads 20 and 26 as before. The windings 6 and 8 now carry currents in the same directions as for the connections for Fig. 3, but the windings are now in series instead of parallel. Both condenser circuits are also in series and are connected across the line. The number of poles is unchanged, because there is no reversal of polarity of any winding. The effect of connecting the windings in series is to reduce the voltage impressed on each main winding, while maintaining the number of poles the same. The magnetic flux density is decreased and the slip is increased. The slip may be approximately five times the slip obtained for the high-speed connection and assuming a normal slip of 5% for the high speed connection at full load, the slip for the middle speed connection will be approximately 25%. The full load speed for this connection is therefore about 1,350 R. P. M. Because of the large slip, the intermediate speed will undergo fluctuations upon changes of load, which are proportionately greater than the fluctuations of speed for the high speed connection. It will be noted that starting torque is afforded both by direct application of line voltage to the condenser circuits and also by voltages induced in the condenser windings by flux linkages from the main windings. The condenser windings are displaced from the main windings by 45 electrical degrees as in the high speed connection.

The low speed connections are as shown in Fig. 5. The leads 28 and 26 are connected at 34 and the line voltage is impressed between the leads 20 and 30. The main windings 6 and 8 are therefore connected in series but with reversed polarity so that the number of poles is doubled, giving a synchronous speed of 900 and a full load operating speed of about 855 R. P. M. In view of the fact that the number of poles is doubled when the series connection is used, the flux densities will be approximately the same as for the high speed connection and normal slips will obtain. The condenser circuit including the winding 12 and the condenser 16 is completely short-circuited on itself and inasmuch as the condenser winding is displaced 90° from the main winding, no voltage is induced in this condenser winding at starting. The condenser winding 12 is therefore ineffective to produce any starting torque. The condenser circuit including the condenser winding 10, however, is directly connected across the line. The fact that this condenser circuit has full-line voltage impressed upon it compensates for the inactivity of the condenser winding 12 at starting. It has been found that with this connection, a starting torque about equal to the starting torque of the high-speed connection may be obtained.

It will be seen that the present invention provides a condenser induction motor adapted for operation at either two or three speeds with a minimum of alteration of connections. In no case is a change in internal connections required. For the two-speed motor, only three external connections are employed and for the three-speed motor, only four external connections are necessary. Any changes in speed are readily effected by simple alterations in these external connections.

Having described the invention, what is claimed is:

1. A condenser induction motor having, in combination, two main windings connected together, two condenser circuits each associated with the main windings and connected across both main windings, each condenser circuit comprising an auxiliary winding and a condenser, a single external lead connected to the point of connection of the main windings, and a pair of leads connected to the opposite ends of the main windings.

2. A condenser induction motor having, in combination, two main windings, two condenser circuits associated therewith, each including an auxiliary winding and a series condenser, each condenser circuit being connected between an end of one main winding and an end of the other main winding, a connection between the main windings, an external lead connected to said connection, and external leads connected to the remaining ends of the main windings.

3. A condenser induction motor having, in combination, two main windings, two condenser circuits associated therewith, each including an auxiliary winding and a series condenser, each condenser circuit being connected between an end of one main winding and an end of the other main winding, and four leads connected respectively to the ends of the main windings.

4. A condenser induction motor having, in combination, two main windings, two condenser circuits associated therewith, each including an auxiliary winding and a series condenser, a lead connected to one end of a main winding and one end of each condenser circuit, a second lead connected to one end of the other main winding and the remaining end of each condenser circuit, and a third lead connected to the remaining ends of both main windings.

5. A condenser induction motor having, in combination, two main windings, two condenser circuits associated therewith, each including an auxiliary winding and a series condenser, one condenser circuit being connected between an end of one main winding and an end of the other main winding, and the other condenser circuit being connected between the remaining ends of the two main windings, and four leads connected respectively to the ends of the main windings.

In testimony whereof I have signed my name to this specification.

CARLTON L. KENNEDY.